Patented Feb. 12, 1929.

1,701,510

UNITED STATES PATENT OFFICE.

SVEN EMIL SIEURIN, OF HOGANAS, SWEDEN.

PRODUCTION OF OXIDE OF ALUMINUM.

No Drawing. Application filed June 4, 1924, Serial No. 717,900, and in Sweden June 15, 1923.

During the production of oxide of aluminum by dissolving raw material (such as clay, argillaceous slate or bauxite) containing such oxide in hydrochloric acid, precipitation of the generated chloride of aluminum by supersaturation with strong hydrochloric acid and decomposition of the chloride by calcination, the precipitation of the aluminum chloride crystals is connected with great difficulties. For effecting a precipitation which is at least fairly complete either hydrochloric acid gas, strongly concentrated by means of sulphuric acid, has hitherto been used as precipitating means or part of the chloride of aluminum has been concentrated into a crystal mass. Both these operations, however, require considerable quantities of heat and the production of crystals free from iron is difficult during the concentration to a crystal mass.

These difficulties are overcome in accordance with this invention which is characterized in that all or part of the mother liquor remaining after the precipitation of the crystals is conducted to the apparatus where the dissolution of the raw material takes place and from that apparatus back to the precipitation apparatus in such a quantity and in such a manner that in a given time the same quantity of oxide of aluminum in the form of chloride is fed to the precipitation apparatus with the mother liquor from the dissolution apparatus as that contained in the crystals which in the same time are brought from the precipitation apparatus to the calcination apparatus, and further in that in the given time a quantity of hydrochloric acid vapors and steam corresponding to that obtainable at the calcination of the said quantity of crystals is introduced into the precipitation apparatus.

The invention is carried out as follows:—

The oxide of aluminum is dissolved out, for instance, at a temperature of 60–100° C. from the raw material in a system of dissolving vessels, from which the concentrated solution of chloride of aluminum, preferably after filtration, is brought to a precipitation apparatus, in which it is acted upon by a mixture of hydrochloric acid vapors and steam coming from a calcination furnace. The chloride of aluminum liquor is introduced in the precipitation apparatus preferably in atomized condition such as a rain passing through the vapor-steam mixture and a settling tank for the crystals generated is provided in the conduit to the dissolving vessel. The crystals are removed and purified from mother liquor by suction or treatment in a centrifugal machine, washed with hydrochloric acid or a pure solution of chloride of aluminum and calcined in the calcination apparatus, while the hydrochloric acid vapors and steam expelled in the furnace are conducted to the precipitating apparatus, as stated above.

All or part of the acid mother liquor remaining after the precipitation of the crystals, is conducted back to the dissolution apparatus and utilized so that the amount of oxide of aluminum dissolved in a given time corresponds to the quantity of oxide of aluminum in the form of aluminum chloride contained in the crystals removed from the process during the same time. The solution formed in the dissolving vessels is conducted to the precipitation apparatus, where new crystals are precipitated with hydrochloric vapors and steam produced at the calcination of the crystals and so on.

By carrying out the process in this manner its course will not become changed to any other extent than that caused by the loss of hydrochloric acid and the accumulation of impure chloride of aluminum. When the quantity of the impurities has increased to the point at which a pure oxide of aluminum can no longer be produced by the calcination of the crystals, part of the chloride of aluminum liquor is drawn off, the hydrochloric acid expelled and again introduced in the process.

During the precipitation of the crystals of chloride of aluminum and the simultaneous adsorption of hydrochloric acid, a considerable quantity of heat is developed, which heat may be removed by conducting the liquor to a closed apparatus through which it is passed in a finely divided state and acted upon by a current of air. The gases from this apparatus, which contain hydrochloric acid, are condensed and the air which now is practically free from the said acid is again used in the apparatus for cooling fresh quantities of liquor. The condensed hydrochloric acid is eventually again introduced into the process for the dissolution of fresh quantities of raw material.

What I claim is:—

1. A continuous process for the production of oxide of aluminum by dissolution of a raw material, containing said oxide, in hydrochloric acid, supersaturation of the chloride of aluminum thus formed with hydrochloric acid and calcination of the crystals of aluminum chloride, characterized in that the mother liquor, remaining after the precipitation of the crystals, is conducted to the apparatus where the dissolution of the raw material takes place, and from that apparatus back to the precipitation apparatus in such a quantity and in such a manner that in a given time the same quantity of oxide of aluminum is fed to the precipitation apparatus with the mother liquor from the dissolution apparatus as that contained in the crystals which in the same time are brought from the precipitation apparatus to the calcination apparatus and that in the same time a quantity of the hydrochloric acid vapors and steam corresponding to that obtainable at the calcination of the said quantity of crystals is introduced in the precipitation apparatus.

2. A continuous process as claimed in claim 1, characterized in that the crystals are precipitated by conducting the solution of chloride of aluminum in a finely divided condition from the dissolution vessels through hydrochloric acid vapors and steam coming from the calcination apparatus.

SVEN EMIL SIEURIN.